: 3,573,896
Patented Apr. 6, 1971

3,573,896
WET PROCESS FOR MANUFACTURING METALLIC COPPER

Shoichiro Hori, 291 Yukigaya, Ota-ku, Tokyo, Japan, and Taijiro Okabe, 1–196 Kitasagigamori, Aramaki, Sendai-shi, Japan
No Drawing. Filed June 10, 1968, Ser. No. 735,572
Int. Cl. C22b 9/02, 9/04, 15/08
U.S. Cl. 75—117                                                7 Claims

ABSTRACT OF THE DISCLOSURE

The process of manufacturing copper and sulfate salts of sodium, of potassium, of magnesium or of calcium, obtained as by-products, by reacting at least one copper compound, such as copper sulfate, copper carbonate, copper oxide or basic copper salts of these compounds with salts of sodium, or of potassium, or of magnesium or of calcium which produce sulfite ions or hydrogen sulfite ions in the water solution, by heating in the presence of water.

BRIEF SUMMARY OF THE INVENTION

The present invention relates to the wet process of manufacturing refined copper by reacting copper compounds, such as copper sulfate, copper carbonate, copper oxide or basic copper salts of these compounds with sulfite salts or hydrogen sulfite salts of alkali metal or of alkaline earth metals in the presence of water, and producing thereby metallic copper and sulfates of alkali metals or alkaline earth metals as by-products.

The primary object of this invention is in obtaining refined metallic copper, while sulfates of alkali metals or of alkaline earth metals are recovered simultaneously as by-products. The other objects may be made clear in the course of the following explanation.

BACKGROUND OF THE INVENTION

There have been numerous proposals regarding the process of reducing copper compounds by reactions involving sulfurous acid. For instance, there is a known process for manufacturing metallic copper from copper oxide ores wherein copper oxide is treated with sulfuric acid and the solution thus obtained is heated by adding sulfurous acid thereto. The Formula 1 shows the above reaction (Van Arsdale, U.S. Pat. 723,943).

$$CuSO_4 + SO_2 + 2H_2O = Cu + 2H_2SO_4 \qquad (1)$$

There is another process (Jumau, G.P. 189,643) for obtaining metallic copper. Copper sulfide ores are roasted and extracted with a solution of ammonium sulfate or ammonium sulfite. The extracted solution is treated with sulfurous acid and the less soluble copper sulfite, $$Cu_2SO_3 \cdot CuSO_3 \cdot 2H_2O$$

is allowed to settle and is subsequently separated, and by heating $Cu_2SO_3 \cdot CuSO_3 \cdot 2H_2O$ under pressure in an autoclave, metallic copper is obtained. But, by and large, the yield of copper from the process is low and separated copper tends to deposit on the wall of the vessel, and is difficult to remove. This is the reason why the same process has not been industrialized as yet. There is also a process (Sherrit Gordon) to manufacture copper from copper sulfate obtained by oxidizing copper ores under pressure in ammonium sulfite aqueous solution; copper ions in the leached solution are reduced with hydrogen to obtain copper. The shortcomings of this procedure, however, are that it takes prolonged reaction due to the slow reduction rate with hydrogen and it is also relatively expensive to provide hydrogen supply facilities which are inevitably involved in this process.

DETAILED DESCRIPTION OF THE INVENTION

This invention consists in a wet process for producing metallic copper, which comprises reacting at least one compound selected from copper sulfate, copper carbonate, copper oxide and basic copper salts of these compounds with at least one salt selected from alkali metal and alkaline earth metal salts which yield sulfite or bisulfite ions or with an alkil metal or alkaline earth metal hydroxide or carbonate in the presence of sulfurous acid, the reaction being carried out in a sealed vessel and in the presence of water.

In the present invention, compounds which may be used industrially include, for example, hydrogen sulfite salts or sulfite salts of sodium, of potassium, or magnesium or of calcium. However, compounds such as sodium hydroxide, potassium hydroxide, magnesium hydroxide or calcium hydroxide which react with sulfurous acid to produce $$HSO_3^{1-} \text{ or } SO_3^{2-}$$

may also be used in conjunction with sulfurous acid. Preferably, the sulfite or bisulfite salts are added in the ratio of 1–2 moles of sulfite or bisulfite, to 1 atom of copper in the copper compound reactant. The reaction temperature should be 140° to 190° to obtain metallic copper directly by the reaction between copper compounds and sulfite ions or bisulfite ions. The process may be conducted in two stages, namely production of copper sulfite ($Cu_2SO_3 \cdot CuSO_3 \cdot 2H_2O$) in the first stage and production of metallic copper in the second stage. Since the copper sulfite is easily formed and converts slowly to metallic copper, even at 100° to 150°, the reactions of both stages may be carried out at 100 to 150° C.

When sulfite salts of alkali metals are used, copper compounds and sulfite of potassium or sodium are charged into an autoclave and heated up to 140° to 190° C., the following reactions take place (M herein represents K or Na):

$$CuO + M_2SO_3 = Cu + M_2SO_4 \qquad (2)$$

$$CuO + 2MHSO_3 + H_2O = Cu + M_2SO_4 + H_2SO_3 \qquad (3)$$

$$CuSO_4 + M_2SO_3 + H_2O = Cu + M_2SO_4 + H_2SO_4 \qquad (4)$$

$$CuSO_4 + 2MHSO_3 + H_2O$$
$$= Cu + M_2SO_4 + H_2SO_4 + H_2SO_3 \qquad (5)$$

$$CuCO_3 \cdot Cu(OH)_2 \cdot H_2O + 2M_2SO_3$$
$$= 2Cu + CO_2 + 2M_2SO_4 + 2H_2O \qquad (6)$$

$$CuCO_3 \cdot Cu(OH)_2 \cdot H_2O + 2MHSO_3$$
$$= 2Cu + CO_2 + M_2SO_4 + H_2SO_4 + 2H_2O \qquad (7)$$

$$2CuSO_4 \cdot 5Cu(OH)_2 \cdot 2H_2O + 7M_2SO_3$$
$$= 7Cu + 7M_2SO_4 + 2H_2SO_4 + 5H_2O \qquad (8)$$

$$2CuSO_4 \cdot 5Cu(OH)_2 \cdot 2H_2O + 8MHSO_3$$
$$= 7Cu + 4M_2SO_4 + 5H_2SO_4 + H_2SO_3 + 5H_2O \qquad (9)$$

and metallic copper and potassium sulfate or sodium sulfate are obtained simultaneously. The same holds true when magnesium salt is used in place of potassium salt or sodium salt; accordingly, when magnesium hydrogen sulfite and copper compounds are charged into an autoclave and heated up to 150° to 160° C., the following reactions take place:

$$CuO + Mg(HSO_3)_2 = Cu + MgSO_4 + H_2SO_4 \qquad (10)$$

$$CuSO_3 \cdot Cu_2SO_3 \cdot 2H_2O + 2Mg(HSO_3)_2$$
$$+ 2H_2O = 3Cu + 2MgSO_4 + 4H_2SO_3 \qquad (11)$$

When the less soluble magnesium sulfite is used, bisulfite ions are initially slowly formed by the following reactions (12) and (13) which take place after dissolution:

$$MgSO_3 = Mg^{2+} + SO_3^{2-} \qquad (12)$$

$$SO_3^{2-} + H_2O = HSO_3^- + HO^- \qquad (13)$$

The bisulfite ions reduce the copper salts to metallic copper with formation of sulfuric acid. The sulfuric acid formed reacts with sulfite salts to give additional bisulfite ions thereby increasing the rate of reduction of the copper salt. Magnesium sulfite reacts with copper sulfite as follows:

$$CuSO_4 + MgSO_3 + H_2O = Cu + MgSO_4 + H_2SO_4 \qquad (14)$$

but compared with the process where magnesium bisulfite is used, the rate of reaction is relatively slow and the quality of the metallic copper obtained in this process is somewhat inferior.

Since the reaction products are a slurry of solid copper in a solution of $MgSO_4$, $H_2SO_4$ and $H_2SO_3$, metallic copper can be filtered and washed. From the solution after copper has been removed, $MgSO_4$, $H_2SO_4$, $H_2SO_3$ may be recovered by the following three methods:

(a) The solution is heated and made into a concentrate while the $SO_2$ vapor produced is absorbed by alkaline magnesium compounds to produce $MgSO_3$ which can be recycled. $MgSO_4$ is crystallized from the solution and may be separated thereby and a sulfuric acid solution remains.

(b) To the solution is added $Mg(OH)_2$ or $MgCO_3$ and a mixed slurry of $MgSO_4$ and $MgSO_3$ is produced. As the mixed slurry is oxidized with air, $MgSO_4$ is crystallized and may be separated.

(c) Slaked lime and slaked calcined dolomite are added to the solution. The resultant mixed slurry of $Mg(OH)_2$ and $CaSO_4 \cdot 2H_2O$ can be separated to remove $Mg(OH)_2$ from $CaSO_4 \cdot 2H_2O$ by elutriation, and when treated with $SO_2(MgSO_3)$ is obtained with can be reused.

In the above process, calcium salt, such as calcium hydrogen sulfite, can be used in place of magnesium salt, and, as Equation 15 indicates, copper is obtained as efficiently as in the previous cases:

$$CuSO_4 + Ca(HSO_3)_2 + 1.5H_2O = Cu + H_2SO_4 + CaSO_4 \cdot \tfrac{1}{2}H_2O + H_2SO_3 \qquad (15)$$

In this case, the reaction products are a slurry consisting of metallic copper, calcium sulfate hemihydrate and mixed acids of sulfuric acid and sulfurous acid.

Unlike the case in which a magnesium salt is used, as the slurry is heated, $SO_2$ in the slurry is eliminated as vapor and then the slurry is cooled to hydrate calcium sulfate hemihydrate to calcium sulfate dihydrate. After metallic copper and calcium sulfate dihydrate in the slurry have been filtered off, they are separated, utilizing their difference in specific gravity (specific gravity of metallic copper and calcium sulfate dihydrate is 8.93 and 2.32, respectively).

The present invention is not confined to the exemplifications given above. It applies to all processes using solution of free sulfurous acid and sulfite salts, alkali hydrogen sulfite salts, or alkali salts and alkali earth metal salts which react with sulfurous acid to produce $$HSO_3^{1-} \text{ or } SO_3^{2-}$$

and in all these processes, copper is obtained just the same.

The present invention can be conducted in the following fashion, wherein copper compounds and sulfite salt or hydrogen sulfite salts of alkali metal or alkaline earth metal are charged into an autoclave (they can be charged with sulfurous acid simultaneously) to be reacted. It also is possible to charge the copper compounds into an autoclave together with aqueous alkali metal salts or alkaline earth metal salts which can react with sulfurous acid to produce $$HSO_3^{1-} \text{ or } SO_3^{2-}$$

and subsequently $SO_2$ is blown into it to produce $$HSO_3^{1-} \text{ or } SO_3^{2-}$$

in order to obtain metal copper directly by reducing the copper compounds, or, in another alternative procedure, copper compounds are not reduced to metallic copper directly by reaction of the copper salts with sulfurous acid or salts thereof and thus the copper sufite is subsequently reacted with further increments of the copper salt to yield metallic copper in a second stage.

By the present invention, high yields of copper are obtained by reducing copper compounds, but residual copper compounds which have not been reacted can be, after copper has been removed, turned into basic copper sulfate for reuse, by driving off $SO_2$ from the solution first, rendering it alkaline, and treating it with sulfite salt or hydrogen sulfite salt, so that basic cupric sulfate is precipitated for recovery.

EXAMPLE 1

Cupric sulfate ($CuSO_4 \cdot 5H_2O$) in the weight indicated in Table 1 was placed into a glass tube of 20 cc. capacity and 10 ml. of mixed solution comprising potassium sulfite solution and caustic potash solution, in the proportion of 1.785 mol/l. and 1, 164 mol/l., respectively, were added and the tube was sealed. The reaction was conducted at 150° C. for an hour and the results were obtained as shown in Table 1.

TABLE 1

| | Experiment Number | | | |
|---|---|---|---|---|
| | 1 | 2 | 3 | 4 |
| Quantities of $CuSO_4 \cdot 5H_2O$, gram | 3.437 | 4.284 | 5.074 | 5.528 |
| $CuM \cdot CuSO_4/SO_3^{2-}$ in solution, mol ratio | 0.771 | 0.961 | 1.138 | 1.240 |
| Copper obtained, gram | 0.7590 | 0.9643 | 1.0765 | 1.0745 |
| Yield, percent | 91.8 | 89.2 | 82.7 | 76.4 |

EXAMPLE 2

Cupric sulfate in quantities indicated in Table 2 was placed into a glass tube of 20 cc. capacity and 10 ml. of aqueous sodium sulfite solution (1.928 mol/l.) were added and the tube sealed. As reaction was conducted at 150° C. for an hour, the results as shown in Table 2 were obtained.

TABLE 2

| | Experiment Number | | | | |
|---|---|---|---|---|---|
| | 1 | 2 | 3 | 4 | 5 |
| Quantities of $CuSO_4 \cdot 5H_2O$, gram. | 2.362 | 3.382 | 4.262 | 4.773 | 5.390 |
| $CuMCuSO_4/SO_3^{2-}$ in solution, mol ratio | 0.491 | 0.703 | 0.886 | 0.992 | 1.121 |
| Copper obtained, gram | 1.4541 | 0.7983 | 1.0275 | 1.0929 | 1.1529 |
| Yield, percent | 97.6 | 95.1 | 93.1 | 90.3 | 84.4 |

EXAMPLE 3

Basic copper carbonate ($CuCO_3 \cdot Cu(OH)_2 \cdot H_2O$) and basic copper sulfate ($2CuSO_4 \cdot 5Cu(OH)_2 \cdot 2H_2O$), and copper oxide were each combined with an aqueous solution containing the bisulfite salts specified below in a ratio of 2 moles of bisulfite salt to 1 mole of copper in copper salt and were placed in a glass tube of 200 cc. capacity and the tube was sealed and heated up to 150° C. The reaction was conducted at 150° C. for an hour, and copper was obtained from the copper salts listed above in the yields shown in the table below.

TABLE 3

| Reducing Agent | Yield of copper, percent | | | |
|---|---|---|---|---|
| | $KHSO_3$ | $NaHSO_3$ | $Mg(HSO_3)_2$ | $Ca(HSO_3)_2$ |
| Copper compounds: | | | | |
| Basic copper carbonate | 70.5 | 72.3 | 70.8 | 58.4 |
| Basic copper sulfate | 82.3 | 81.0 | 96.2 | 91.3 |
| Copper oxide | 86.2 | 85.3 | 87.6 | 84.6 |

EXAMPLE 4

One liter of a solution comprising $CuSO_4$ (71.43 g.) and $Mg(HSO_3)_2$ (93.23 g.) was placed in an autoclave, and was reacted at 150° C. for 90 minutes, and then cooled to the ambient temperature. When the precipitated copper was filtered and washed, 26.8 g. of metallic copper was obtained. The reduction rate was 94%. Next, 800 cc. of separated mother solution was heated, and after $SO_2$ vapored off, 20 g. of magnesium oxide was added. When it was heated, the entire quantity of unreacted copper salt in the solution was converted to 2.82 g. of basic copper sulfate which was precipitated. This was filtered off, leaving 780 cc. of $MgSO_4$ solution (0.815 mol/l).

EXAMPLE 5

One liter of an aqueous solution containing $CuSO_4$ (71.43 g.) and $Ca(HSO_3)_2$ (101.2 g.) was placed in an autoclave and reacted at 150° C. for 90 minutes by shaking, and then, when it was cooled to the ambient temperature, precipitates consisting of metallic copper and calcium sulfate dihydrate were obtained. The separated solution (800 cc.) was heated to drive off any $SO_2$ remaining in solution and 130 cc. of milk of lime (10% CaO in water) was added to neutralize $H_2SO_4$ and calcium sulfate dihydrate was precipitated. Further, by adding 30 cc. of milk of lime, 3.12 g. of copper was recovered in the form of 81 g. of basic copper sulfate which could be reacted with calcium sulfite.

What is claimed is:

1. A wet process for producing metallic copper, which comprises reacting at least one compound selected from copper sulfate, copper carbonate, copper oxide and basic copper salts of these compounds with at least one compound selected from alkali metal and alkaline earth metal salts which yield sulfite or bisulfite ions in aqueous media, and from alkali metal and alkaline earth metal hydroxides and carbonates in the presence of sulfurous acid, the reaction being carried out at an elevated temperature in a sealed vessel and in the presence of water.

2. The process of claim 1 in which at least one compound is selected from the group consisting of $Na_2SO_3$, $K_2SO_3$, $MgSO_3$, $NaHSO_3$, $KHSO_3$, $Mg(HSO_3)_2$, $CaSO_3$ and $Ca(HSO_3)_2$.

3. The process of claim 1 in which at least one salt selected from the group consisting of $Na_2SO_3$, $K_2SO_3$, $MgSO_3$, $NaHSO_3$, $KHSO_3$, $Mg(HSO_3)_2$, is added to the copper compounds in the ratio of 1–2 moles of said salt to 1 mole of copper in the copper compounds and the mixture is heated in a sealed vessel at a temperature of 140 to 190° C. to produce metallic copper.

4. The process of claim 1 in which at least one salt selected from the group consisting of $Na_2SO_3$, $K_2SO_3$, $MgSO_3$, $NaHSO_3$, $KHSO_3$, and $Mg(HSO_3)_2$ is added to the copper compounds in a ratio of 1–2 moles of said salt to 1 mole of copper in the copper compounds and the mixture is heated in a sealed vessel at 100 to 150° C. to produce copper sulfite ($Cu_2SO_3 \cdot CuSO_3 \cdot 2H_2O$) as an intermediate thereafter converting said copper sulfite to metallic copper, recovering said metallic copper, and heating the residual solution to drive off $SO_2$ gas and to crystallize a sulfate salt.

5. The process of claim 1 in which at least one salt selected from the group consisting of $CaSO_3$ and $Ca(HSO_3)_2$ is added to the copper compounds in a ratio of 1–2 moles of said salt to 1 mole of copper in copper compounds, and the mixture is heated in the sealed vessel to 140 to 190° C. to produce metallic copper and calcium sulfate hemihydrate and then cooled to hydrate the calcium sulfate hemihydrate to calcium sulfate dihydrate and separating the metallic copper and said calcium sulfate dihydrate.

6. The process of claim 1 in which at least one salt selected from the group consisting of $CaSO_3$ and $Ca(HSO_3)_2$ is added to the copper compounds in a ratio of 1–2 moles of said salt to 1 mole copper in copper compounds and the mixture is heated in the sealed vessel to 100 to 150° C. to produce copper sulfite $$(Cu_2SO_3 \cdot CuSO_3 \cdot 2H_2O)$$

and calcium sulfate hemihydrate, heating the reaction products to drive off $SO_2$, cooling to hydrate the calcium sulfate hemihydrate to calcium sulfate dihydrate, converting said copper sulfite to metallic copper, and separating the metallic copper and calcium sulfate.

7. The process of claim 1 in which at least one compound selected from the group consisting of NaOH, KOH, $Mg(OH)_2$, $Ca(OH)_2$, $Na_2CO_3$, $NaHCO_3$, $K_2CO_3$, $KHCO_3$, $MgCO_3$, and $CaCO_3$ is used with sulfurous acid.

References Cited

UNITED STATES PATENTS

| 1,943,334 | 1/1934 | Mitchell | 75—101X |
| 2,357,715 | 9/1944 | Westby | 75—117X |

L. DEWAYNE RUTLEDGE, Primary Examiner

J. E. LEGRU, Assistant Examiner

U.S. Cl. X.R.

75—97, 101, 108, 119